United States Patent
Sasaki et al.

(10) Patent No.: US 12,301,980 B2
(45) Date of Patent: May 13, 2025

(54) IMAGE PROCESSING DEVICE, IMAGE PROCESSING METHOD, IMAGING DEVICE, AND STORAGE MEDIUM

(71) Applicant: CANON KABUSHIKI KAISHA, Tokyo (JP)

(72) Inventors: Takashi Sasaki, Kanagawa (JP); Asahi Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 17/747,040

(22) Filed: May 18, 2022

(65) Prior Publication Data

US 2022/0385827 A1  Dec. 1, 2022

(30) Foreign Application Priority Data

May 25, 2021 (JP) .................................. 2021-087848

(51) Int. Cl.
*H04N 23/63* (2023.01)
*H04N 23/80* (2023.01)

(52) U.S. Cl.
CPC .......... *H04N 23/632* (2023.01); *H04N 23/80* (2023.01)

(58) Field of Classification Search
CPC .. H04N 23/632; H04N 23/80; H04N 23/6811; H04N 23/683; H04N 23/60
See application file for complete search history.

(56) References Cited

U.S. PATENT DOCUMENTS

| | | | |
|---|---|---|---|
| 4,667,228 A | 5/1987 | Kawamura et al. |
| 4,760,608 A | 7/1988 | Suzuki |
| 4,855,765 A | 8/1989 | Suzuki et al. |
| 5,003,326 A | 3/1991 | Suzuki et al. |

(Continued)

FOREIGN PATENT DOCUMENTS

| | | | |
|---|---|---|---|
| JP | 2005-073027 A | 3/2005 |
| JP | 2008-135812 A | 6/2008 |

(Continued)

OTHER PUBLICATIONS

JP 2008-135812 Translation (Year: 2008).*
Jan. 21, 2025 Japanese Official Action in Japanese Patent Appln. No. 2021-087848.

*Primary Examiner* — Chiawei Chen
*Assistant Examiner* — Angel L Garces-Rivera
(74) *Attorney, Agent, or Firm* — Venable LLP

(57) ABSTRACT

An imaging device acquires an image and relevant information of a subject related to the image in a depth direction and performs image processing. A distance information generation unit generates a distribution of additional information (a defocus map, a distance map, etc.) related to the image. A distortion/blur correction unit performs deformation processing on the acquired image and performs deformation processing on the distribution of the additional information according to the deformation of the image. A color information conversion processing unit performs processing of converting the distribution of the additional information into color information. A superimposition processing unit outputs an image obtained by superimposing image information, which has been obtained by converting the distribution of the additional information into the color information, on the deformation-processed captured image to a display unit.

34 Claims, 15 Drawing Sheets

(56) References Cited

U.S. PATENT DOCUMENTS

| | | |
|---|---|---|
| 5,371,609 A | 12/1994 | Suzuki et al. |
| 5,414,531 A | 5/1995 | Amemiya et al. |
| 5,539,476 A | 7/1996 | Sasaki |
| 6,097,510 A | 8/2000 | Kanno et al. |
| 6,100,929 A | 8/2000 | Ikeda et al. |
| 6,301,017 B1 | 10/2001 | Suzuki et al. |
| 8,619,122 B2 | 12/2013 | Gilboa et al. |
| 9,710,913 B2 | 7/2017 | Sasaki |
| 10,659,766 B2 | 5/2020 | Nobayashi et al. |
| 11,327,606 B2 | 5/2022 | Suzuki et al. |
| 2011/0187820 A1 | 8/2011 | Gilboa et al. |
| 2022/0244831 A1 | 8/2022 | Suzuki et al. |

FOREIGN PATENT DOCUMENTS

| | | |
|---|---|---|
| JP | 2008-145465 A | 6/2008 |
| JP | 2013-519155 A | 5/2013 |
| JP | 2014-093714 A | 5/2014 |
| JP | 2019-134431 A | 8/2019 |
| JP | 2020-048055 A | 3/2020 |
| JP | 2020-154037 A | 9/2020 |
| JP | 2021-068932 A | 4/2021 |

* cited by examiner

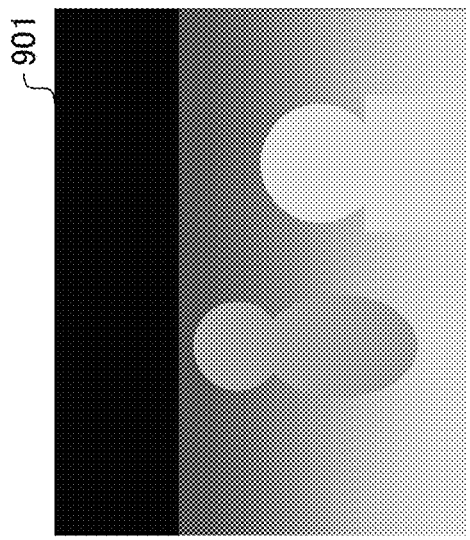
FIG. 9B
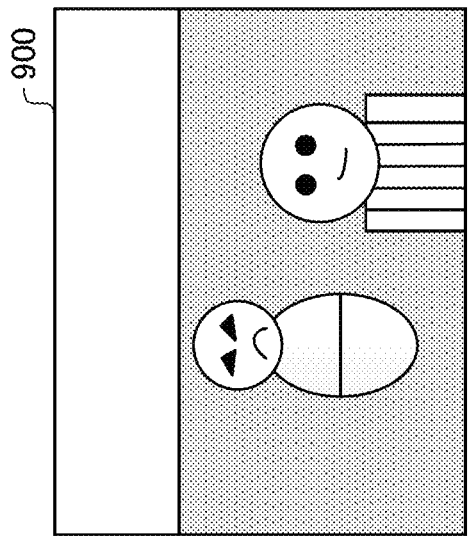
FIG. 9A
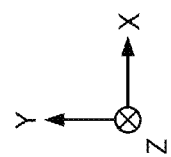

IMAGE PROCESSING DEVICE, IMAGE PROCESSING METHOD, IMAGING DEVICE, AND STORAGE MEDIUM

BACKGROUND OF THE INVENTION

Field of the Invention

The present invention relates to a technique of presenting a user with an image, depth information that is related to the image, and the like to support adjustment of focus and depth of the image.

Description of the Related Art

When an imaging device detects a subject, for example, image processing is performed to present a user with whether the focus is on a specific subject. Japanese Patent Laid-Open No. 2005-73027 discloses a technique called "focus peaking" in which the contour of a focused subject is displayed with a highlight. In addition, Japanese Patent Laid-Open No. 2008-135812 discloses a technique in which, when focusing is manually operated, a color image is converted into a monochromatic image and then the image of the focused subject is painted in a color according to the distance to the subject so that the user can intuitively gain a sense of distance to the subject.

According to the related art disclosed in Japanese Patent Laid-Open No. 2005-73027, when a focus is on a subject, when the contour of the subject is displayed with a highlight as long as a focus is thereon, the user is not capable of grasping the depth of field of the photographed scene. For this reason, the convenience in the adjustment of the depth of field needs to be improved.

In addition, in the related art disclosed in Japanese Patent Laid-Open No. 2008-135812, an image with colored areas determined based on a distance image is generated from a monochromatic image with highlighted high frequency components and displayed. However, because no positional shift between the monochromatic image and the distance image is considered, it is not possible to perform coloring processing on correct areas in a case where a positional shift between both images has occurred.

SUMMARY OF THE INVENTION

The present invention aims to provide an image processing device that can improve convenience by aligning a positional relationship between an image and relevant information related to the image.

An image processing device according to an embodiment of the present invention is an image processing device that acquires an image and relevant information of a subject of the image in a depth direction or a movement direction and performs processing, the image processing device including a deformation unit configured to perform deformation processing on the image and the relevant information, and an output unit configured to superimpose an image based on the relevant information on the image and output the image, in which the deformation unit performs the deformation processing on the relevant information corresponding to the deformation processing performed on the image, and the output unit superimposes the deformation-processed relevant information on the deformation-processed image and outputs the image.

Further features of the present invention will become apparent from the following description of embodiments with reference to the attached drawings.

BRIEF DESCRIPTION OF THE DRAWINGS

FIGS. 9A and 9B are diagrams exemplifying results after distortion/blur correction according to the first example.

DESCRIPTION OF THE EMBODIMENTS

Embodiments of the present invention will be described below in detail with reference to the drawings. The embodiments introduce an application example of an imaging device that can acquire depth information, distance information, and the like of a subject of an image, as an example of an image processing device. Depth information is information corresponding to a distribution of a distance to a subject in the depth direction in an imaging range (depth direction). The present invention is applicable to any equipment that can acquire a captured image and distance information related to the imaging range of the captured image. Distance information is two-dimensional information representing a distribution of a defocus amount and the like of an image at each pixel of a captured image. As an example, a distribution of a value obtained by normalizing a defocus amount with a focal depth (e.g., 1 Fδ, wherein F represents an aperture value and δ represents an allowable diameter of a circle of confusion) will be described. Here, as an aperture value F, a fixed value on the entire surface having an aperture value near the center of an image height may be applied, or a distribution of an aperture value to which an aperture value of a peripheral image height becoming lower due to vignetting of the imaging optical system. Hereinafter, a distribution based on a defocus amount will be referred to as a "defocus map."

Distance information applied in the present invention may be information corresponding to a distribution of a distance to a subject in the depth direction in an imaging range. For example, distribution information of a defocus amount before being normalized with a focal depth or a depth map indicating a distance to a subject for each pixel can be used. In addition, the information may be two-dimensional information representing a phase difference used to derive a defocus amount. The phase difference is equivalent to a shift amount of relative images having different perspectives. In addition, a distance map converted into actual distance information with respect to a subject through a position of the focus lens of the imaging optical system can be used. In other words, for distance information, any information can be used as long as it represents change according to a distance distribution in a depth direction.

First Example

Figure 1:
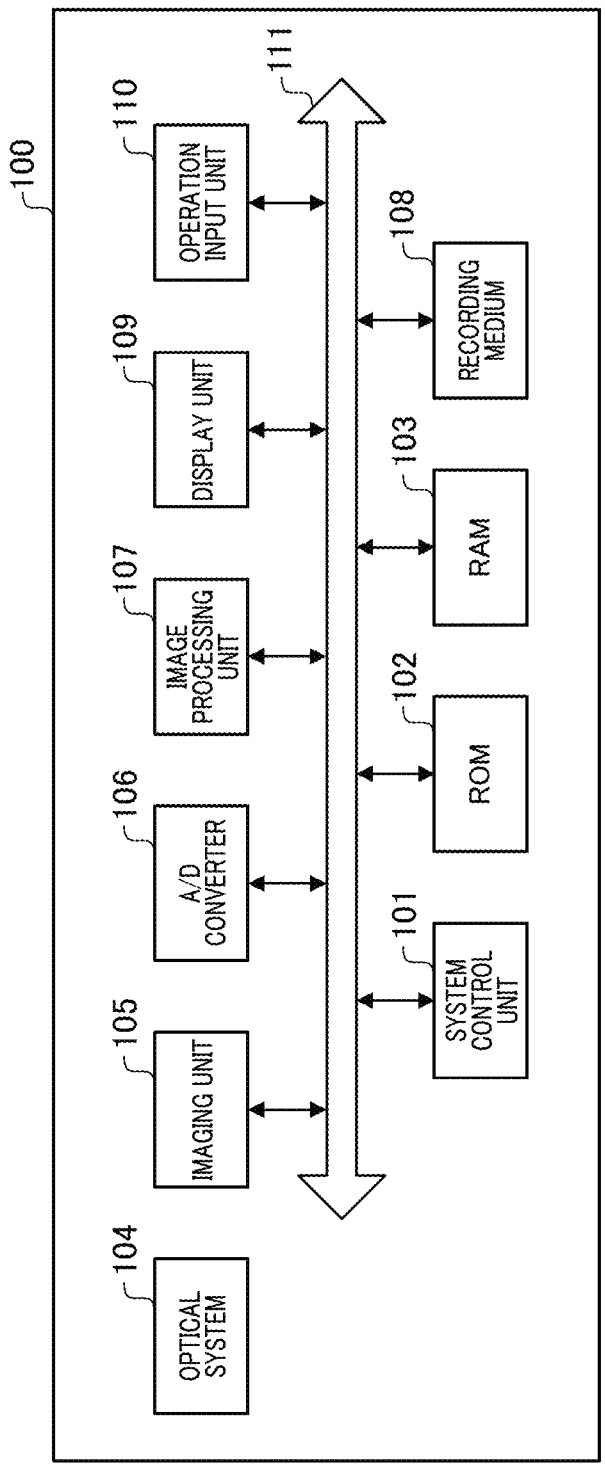
FIG. 1 is a block diagram illustrating a functional configuration of an imaging device according to an embodiment.

FIG. 1 is a block diagram illustrating a functional configuration of a digital camera (which will be referred to simply as a "camera" below) 100 according to the present embodiment. The camera 100 is an example of an imaging device with an image processing device. The image processing device processes images with a defocus map superimposed thereon (which will be referred to as a "map-superimposed image" below). There are embodiments in which, for example, the image processing device performs display processing of the map-superimposed image, and the image processing device outputs the processed map-superimposed image to an external device and the external device displays the map-superimposed image.

A system control unit 101 controls constituent elements of the camera 100. The system control unit 101 includes, for example, a central processing unit (CPU) to read an operation program from a read only memory (ROM) 102 and load the program on a random access memory (RAM) 103 for execution. The ROM 102 is a rewritable non-volatile memory, for example, a flash ROM. The ROM 102 stores parameters and the like necessary for operations of the constituent elements of the camera 100, in addition to the operation program. On the other hand, the RAM 103 is a rewritable volatile memory. The RAM 103 is used not only as a loading area for the operation program but also a transient storage area for intermediate data output through operations of the constituent elements of the camera 100. In the present embodiment, it is assumed that the system control unit 101 and an image processing unit 107, which will be described below, use the RAM 103 as a work memory.

An optical system 104 is an imaging optical system that forms an image of light from a subject in an imaging unit 105. The optical system 104 has, for example, a fixed lens, a variable magnification lens that changes a focal distance, and a focus lens that adjusts a focus. The optical system 104 has an aperture to adjust an amount of light during photographing by adjusting an aperture diameter of the optical system 104 using the aperture.

The imaging unit 105 includes an image sensor such as a charge coupled device (CCD) image sensor or a complementary metal oxide semiconductor (CMOS) image sensor. The imaging unit 105 performs photoelectric conversion on an optical image formed on the imaging plane of the image sensor by the optical system 104 and outputs an analog image signal to an A/D converter 106. The A/D converter 106 performs A/D conversion processing on the input analog image signal and outputs digital image data (which will also be referred to simply as "image data") to the RAM 103 to be stored therein.

The image processing unit 107 performs various kinds of image processing on the digital image data stored in the RAM 103. Specifically, when RGB image data in a Bayer pattern is input, the image processing unit 107 performs simultaneous processing to generate color signals R, G, and B. Next, the image processing unit 107 performs gain multiplication processing of the color signals R, G, and B based on gain values of white balance adjustment to adjust white balance. Processing of generating a luminance signal Y from RGB signals is performed, various kinds of processing such as contour enhancement processing, luminance gamma correction, and the like are performed on the luminance signal Y, and output processing of the image signal is performed. In addition, a matrix operation or the like is performed on the color signals R, G, and B, a conversion to desired color balance, and gamma correction are performed, and then a chrominance signal UV is generated. The image processing unit 107 records the image-processed image data in a recording medium 108. In addition, the image processing unit 107 includes multiple constituent elements (see FIG. 3) to implement functions according to the present invention. Details of processing performed by each of the constituent elements will be described below.

The recording medium 108 is attachable to and detachable from the camera 100, for example, and a memory card, or the like is used. The recording medium 108 records the image data (captured image data) processed by the image processing unit 107, an image signal (RAW image signals) A/D converted by the A/D converter 106, and the like.

A display unit 109 includes a display device such as a liquid crystal display device (LCD) and displays various types of information on the camera 100. The display unit 109 functions as a digital viewfinder by performing see-through display of the A/D converted image data, for example, during capturing of the imaging unit 105. In addition, the display unit 109 displays, on the screen, a map-superimposed image in which color information converted from defocus information generated by the image processing unit 107 has been superimposed.

An operation input unit 110 is used as a user input interface and includes a release switch, a setting button, a mode setting dial, and the like. The operation input unit 110 outputs a signal corresponding to an operation input to the system control unit 101 when detecting an operation input from a user. In addition, in a form in which the display unit 109 has a touch panel sensor, the operation input unit 110 functions as an interface to detect touch operations made on the screen of the display unit 109.

The functional block elements of the camera 100 are basically connected to one another by a bus 111 to enable signals to be transmitted to and received from one another via the bus 111.

Figure 2A:
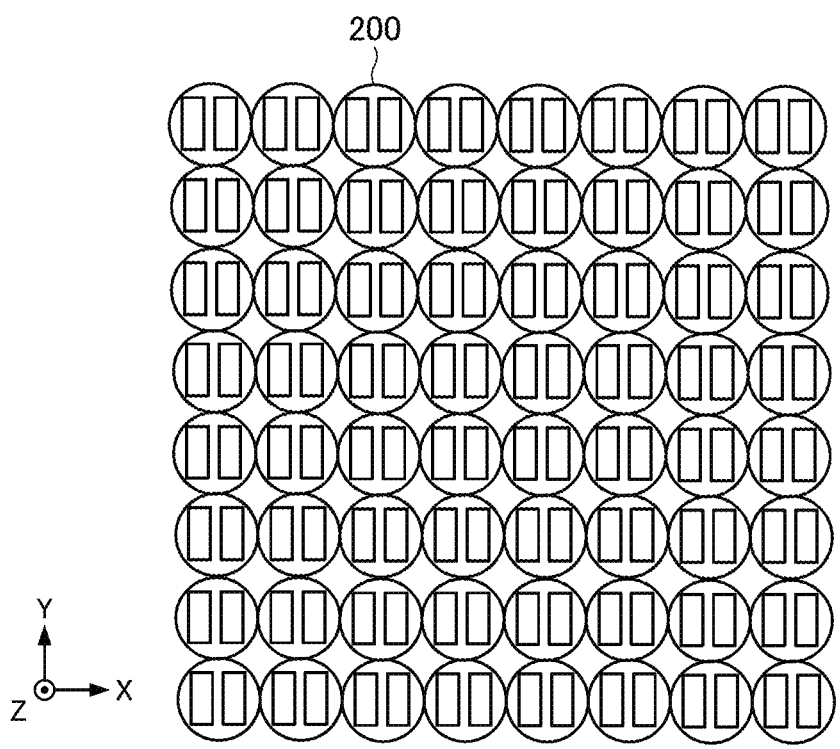
FIGS. 2A and 2B are diagrams illustrating a configuration of an image sensor included in an imaging unit according to the embodiment.

Next, a detailed configuration of the image sensor of the imaging unit 105 will be described with reference to FIGS. 2A and 2B. FIG. 2A is a schematic diagram illustrating a configuration in which multiple pixels 200 are regularly arranged two-dimensionally. The Z direction perpendicular to the paper surface of FIG. 2A is defined as an optical axis direction, and two directions orthogonal to each other within the paper surface are defined as an X direction and a Y direction. The horizontal direction is set as the X direction, and the vertical direction is set as the Y direction. Although the multiple pixels 200 are arranged in a two-dimensional grid shape, for example, the arrangement is not limited to the grid arrangement structure, and other arrangement structures may be employed.

Figure 2B:
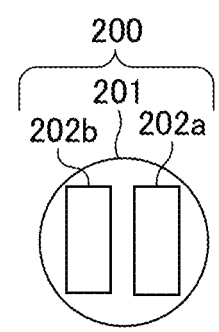

FIG. 2B is a schematic diagram illustrating one pixel. Each pixel 200 has a microlens 201 and a pair of photoelectric converters 202a and 202b. A first pupil division pixel is configured by the photoelectric converter 202a, a second pupil division pixel is configured by the photoelectric converter 202b, and the image sensor has a distance measuring function in an imaging plane phase difference range-finding method.

All of the pair of photoelectric converters 202a and 202b have a rectangular shape having the longitudinal direction in the Y direction, and are formed in the same size. The photoelectric converters 202a and 202b of each pixel 200 are arranged line-symmetrically having the perpendicular bisector of the microlens 201 in the Y direction as the axis of symmetry. Further, a shape of the imaging plane in the pupil division pixels is not limited thereto, and may have any shape. In addition, an arrangement direction of the pupil division pixels is not limited to the X direction, and may be the Y direction, and in other embodiments three or more divisions can be applied.

The imaging unit 105 can acquire an A image related to an image signal output from the first pupil division pixel and a B image related to an image signal output from the second pupil division pixel that are provided for all pixels of the image sensor. The A and B images are in a relationship of having parallax according to a distance to the focus position. That is, the A and B images are viewpoint images having different viewpoints. More specifically, in each pixel 200, the pair of photoelectric converters 202a and 202b performs photoelectric conversion on different light fluxes incident through the microlens 201 according to the amount of received light, respectively. That is, photoelectric conversion is performed on optical images from the light fluxes each of which has passed through different areas of the exit pupil of the optical system 104. Because the A and B images are generated based on light fluxes that have passed through different areas of the exit pupil (pupil division areas), the subject is imaged at the photographing position deviating by the difference between the positions of the center of gravity of the pupil division areas, and thus parallax occurs. In other words, the A and B images are a group of images acquired by imaging the subject from different viewpoints.

In the present example, the A and B images used to derive a distance distribution of a subject in an imaging range can be acquired using the image sensor (FIG. 2A) of the imaging unit 105. However, as a method of acquiring A and B images, for example, a method of acquiring A and B images from a group of images captured by multiple imaging devices installed at a distance of a baseline length may be used. Alternatively, a method of acquiring A and B images from a group of images captured by one imaging device (a so-called binocular camera or multi-eye camera) having multiple optical systems and imaging units may be used.

Figure 3:
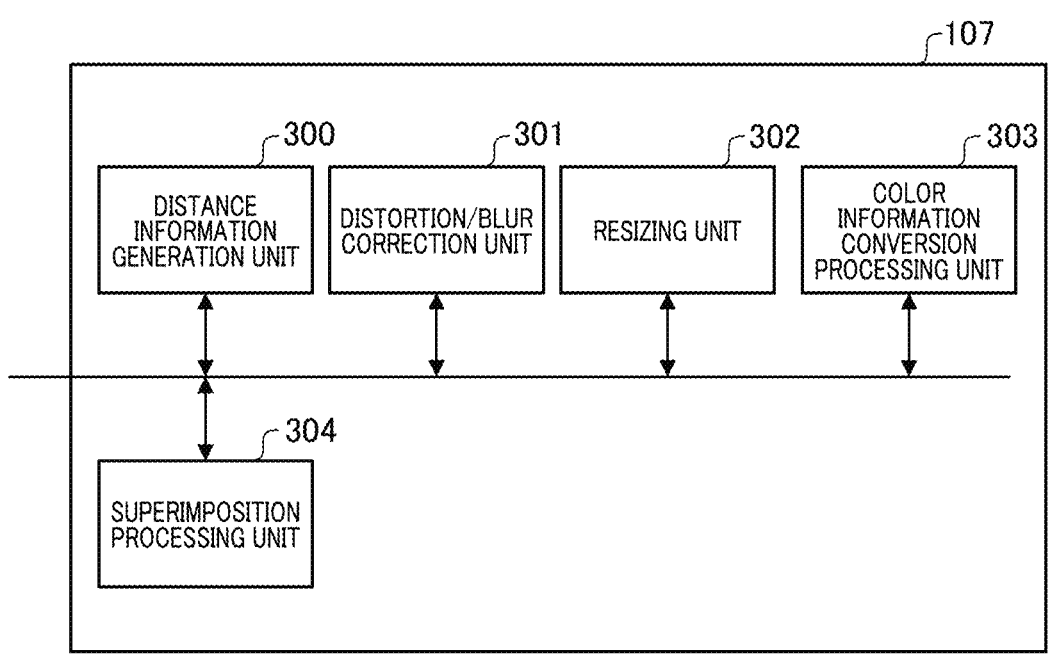
FIG. 3 is a block diagram illustrating a configuration of an image processing unit according to the embodiment.

FIG. 3 is a functional block diagram of the image processing unit 107. The image processing unit 107 includes a distance information generation unit 300, a distortion/blur correction unit 301, a resizing unit 302, a color information conversion processing unit 303, and a superimposition processing unit 304. In the present example, information of a defocus map representing a distribution of defocus amounts is used as relevant information to captured images. As modification processing related to images and relevant information, examples of distortion aberration correction, image blur correction, and resizing will be introduced.

The distance information generation unit 300 analyzes an image signal acquired by the imaging unit 105 to generate a defocus map as data of an additional information distribution corresponding to the image related to the image signal. The distortion/blur correction unit 301 corrects an image for display to be displayed on the display unit 109, distortion of the image caused by characteristics of the optical system 104 on the defocus map, image blurs caused by camera shakes.

The resizing unit 302 performs resizing on the defocus map to match the resolution of the image for display. The color information conversion processing unit 303 performs processing of converting a value of the defocus map into color information. The superimposition processing unit 304 performs processing of superimposing the color information from the color information conversion processing unit 303 on the image for display to generate a map-superimposed image.

Calculation processing of a defocus amount will be described with reference to FIGS. 4 and 5. The distance information generation unit 300 generates a defocus map as information representing a distribution of distances to a subject in the depth direction in an imaging range. The defocus map includes information of defocus amount of the image of each subject included in a captured image and has a pixel structure corresponding to the captured image. A defocus amount can be derived based on acquired parallax information, that is, A and B images that are a group of images having parallax.

Figure 4:
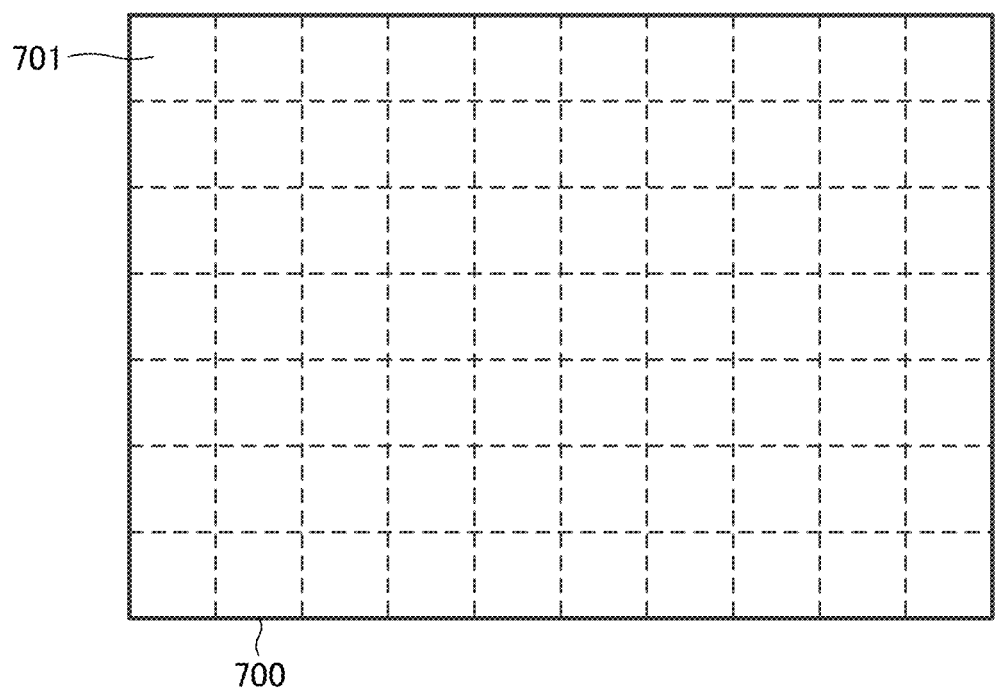
FIG. 4 is an illustrative diagram for image division processing.

FIG. 4 is an illustrative diagram for image division processing. Processing of dividing an image (A and B images) 700 into fine blocks 701 indicated by dashed lines is performed, for example. In a case where each pixel of a target A image is regarded as a pixel of interest, each fine block 701 is set as an area in a predetermined size around the pixel of interest. Although it is assumed below that a fine block 701 is set as a square area of m×m pixels around a pixel of interest, a shape and a size of a fine block 701 can be arbitrarily set. In addition, a fine block 701 is set for each pixel of interest, and fine blocks 701 may overlap on different pixels of interest.

If a fine block 701 is set for each pixel of A and B images, correlation operation processing is performed for each pixel (pixel of interest) in both images, and a shift amount of the image (image shift amount) included in the fine block 701 corresponding to the pixel is derived. For example, a case in which the number of data pieces (the number of pixels) of a pair of fine blocks 701 defined for pixel of interests at the same position in A and B images is m is assumed. It is assumed that pieces of pixel data of the pair of fine blocks 701 are denoted by E(1) to E(m) and F(1) to F(m), a shift amount of data is denoted by k, and the unit is pixel. k is an integer value. When the correlation amount is expressed as C(k), a correlation operation is performed using the following formula (1).

$$C(k)=\Sigma|E(n)-F(n+k)| \tag{1}$$

The operation $\Sigma$ in the formula (1) is performed for the variable n, and n and n+k are assumed to be limited in the range from 1 to m. In addition, the shift amount k is a relative shift amount using a detection pitch of a pair of image data pieces as a unit. In this way, a correlation amount of a pair of pupil division images (the pair of fine blocks 701) for one pixel of interest is derived. A specific example will be introduced in FIG. 5.

Figure 5:
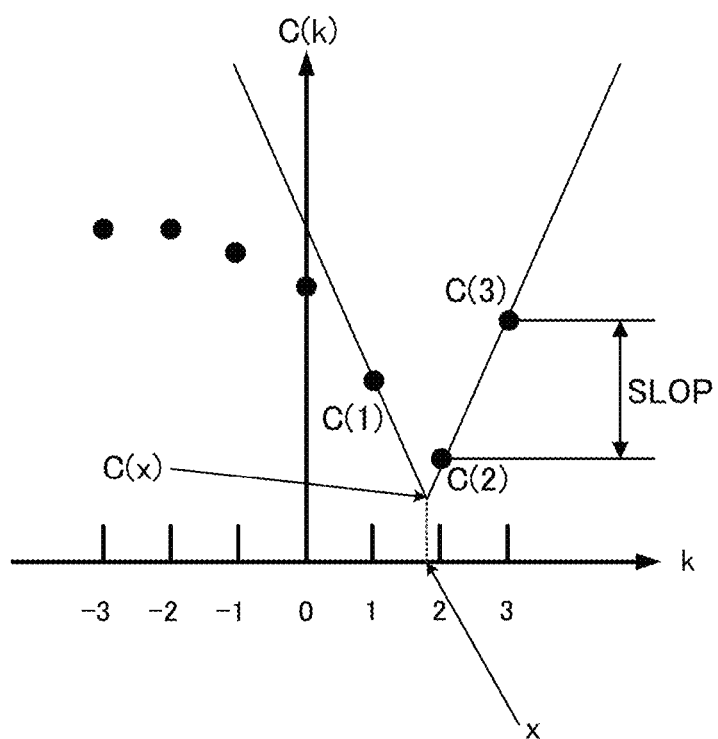
FIG. 5 is an illustrative diagram for derivation of a defocus amount.

In FIG. 5, the horizontal axis represents shift amount k, and the vertical axis represents correlation amount C(k). A shift amount k and a correlation amount C(k) have a discrete relationship. The correlation amount C(k) has a minimum value with respect to the image shift amount having the highest correlation in this case, a shift amount x can be derived using a 3-point interpolation method represented by the following formulas (2) to (5). While the shift amount k is discrete, the shift amount x is an amount that gives a minimum value C(x) with respect to a continuous correlation amount.

$$x = kj + D/SLOP \quad (2)$$

$$C(x) = C(kj) - |D| \quad (3)$$

$$D = \{C(kj-1) - C(kj+1)\}/2 \quad (4)$$

$$SLOP = \mathrm{MAX}\{C(kj+1) - C(kj), C(kj-1) - C(kj)\} \quad (5)$$

Here, kj is a shift amount k at which the discrete correlation amount C(k) is minimized. The shift amount x calculated as above is included in distance information as an image shift amount of one pixel of interest. Further, the unit of the image shift amount is [pixel].

Hence, a defocus amount (denoted by DEF) of each pixel of interest can be derived from the following formula (6) using the image shift amount x.

$$DEF = KX \cdot PY \cdot X \quad (6)$$

Here, PY represents a pixel pitch of the image sensor (a distance between pixels constituting the image sensor; unit [mm/pixel]). KX represents a conversion factor determined according to a size of an opening angle of the center of gravity of a light flux passing through a pair of range-finding pupils. Further, because the size of the opening angle of the center of gravity of the light flux passing through the pair of range-finding pupils changes according to a size of the aperture opening (F number) of the lens, it is assumed to be determined according to setting information at the time of imaging.

The distance information generation unit 300 derives a defocus amount of a subject for each pixel of a captured image by repeatedly calculating the position of the pixel of interest while shifting the position by one pixel. After the defocus amount of each pixel is derived, the value normalized by the depth of focus is calculated, and a defocus map that is two-dimensional information of the same structure as the captured image having the normalized value as a pixel value is generated. That is, the defocus amount is an amount that changes according to a shift amount of the position of a subject in the depth direction from the distance to the subject in focus in the captured image. Thus, the defocus map has information equivalent to the distance distribution of the subject in the depth direction at the time of imaging. In addition, by performing the normalization processing in the depth of focus, the change in depth in the depth direction can be grasped. In addition, the focused area (area on which focus is placed) in the captured image can be specified using the defocus map.

Figure 6:
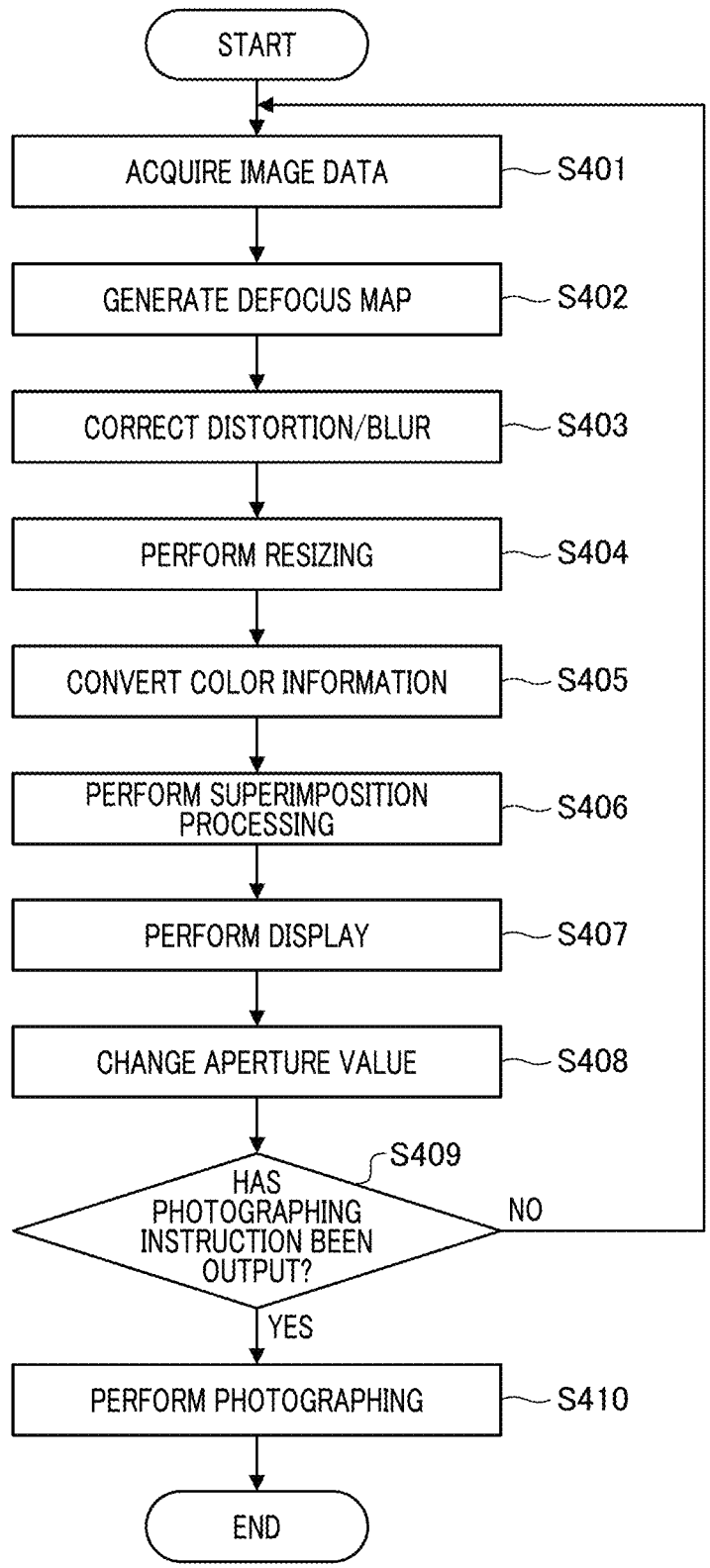
FIG. 6 is a flowchart for explaining image processing according to a first example.

Control over a photographing operation will be described with reference to FIG. 6. With the camera 100, a user adjusts the depth while viewing the map-superimposed image on the display screen and performs photographing. FIG. 6 is a flowchart for explaining processing performed by the camera 100. The following processing is implemented by the CPU of the system control unit 101, for example, reading a program stored in the ROM 102 and loading the program in the RAM 103 for execution.

When power is input to the camera 100, image data acquiring processing is performed in S401. To display the state of the imaging range on the display unit 109, the imaging unit 105 acquires image data under control of the system control unit 101. The acquired image data is an A image related to the first pupil division pixel, a B image related to the second pupil division pixel, and an added image of the A and B images (A+B image). The added image is an image corresponding to the state with no pupil division, and is used as an image for display. A detailed example thereof will be described below using FIG. 7.

In S402, the distance information generation unit 300 generates a defocus map corresponding to the image for display based on the A and B images acquired in S401. In S403, the distortion/blur correction unit 301 performs distortion aberration correction and electronic image blur correction on the image for display acquired in S401 and the defocus map generated in S402. Methods for distortion aberration correction and image blur correction are known, and specifically, the technique disclosed in Japanese Patent Laid-Open No. 2014-93714 can be applied.

In S404, the resizing unit 302 performs resizing so that the resolution of the defocus map corrected in S403 has the same resolution as that of the image for display. In S405, the color information conversion processing unit 303 performs processing of converting the value of the defocus map resize-processed in S404 into color information to help the user visually recognize it easier.

In S406, the superimposition processing unit 304 superimposes the color information converted from the defocus amount in S405 to be transparent on the image for display corrected in S403. In S407, the system control unit 101 performs control such that the image generated by the image processing unit 107 in S406 is displayed on the display unit 109.

In S408, the aperture value of the optical system 104 is processed to be changed. For example, it is assumed that the user has noticed that a figure subject is not in the depth when viewing the image displayed on the screen of the display unit 109. In this case, the user makes an operation of changing the aperture value of the optical system 104 to the small aperture side using the operation input unit 110. At this time, the system control unit 101 receives the operation signal to perform control of driving the aperture of the optical system 104 according to the operation instruction.

In S409, the system control unit 101 determines whether the user has given a photographing instruction via the operation input unit 110. If it is determined that a photographing instruction has been given, the processing proceeds to S410. On the other hand, if it is determined that no photographing instruction has been given, the processing returns to S401, image data is acquired, and processing of updating the image to be displayed on the display unit 109 is continued. In S410, the system control unit 101 performs the photographing operation control, and then ends the series of processing.

Figure 7:
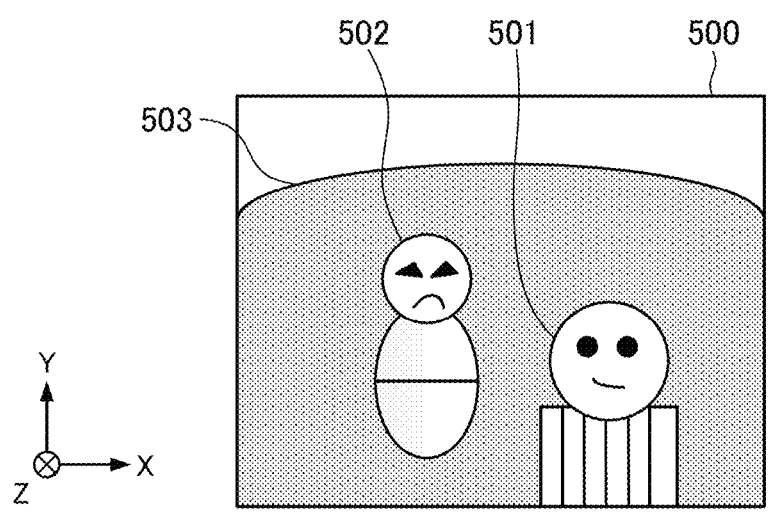
FIG. 7 is an illustrative diagram for a subject distribution in an imaging range according to the first example.

The processing shown in FIG. 6 will be described in detail with reference to FIGS. 7 to 11. FIG. 7 is a diagram for describing a subject distribution in an imaging range 500. In the imaging range 500, there are a figure subject 501, another figure subject 502 standing at a position farther from the camera 100 than that of the figure subject 501, and a horizon 503. A deformation has occurred in the image of the horizon 503 due to the distortion aberration caused by the optical system 104, as is represented in exaggeration in FIG. 7. If the image is displayed as it is, it appears differently from the actual scene, and results in an unnatural look. In addition, it is assumed that, while focus is on the figure subject 501 in the depth, the figure subject 502 is in a state of being slightly out of focus outside the depth. In the present example, since the aperture value is changed in S408 of FIG. 6, it is assumed that photographing is performed after adjusting the depth range so that the figure subject 502 is in the depth. In addition, the size of the image is set to 6000×4000 pixels.

Figure 8:
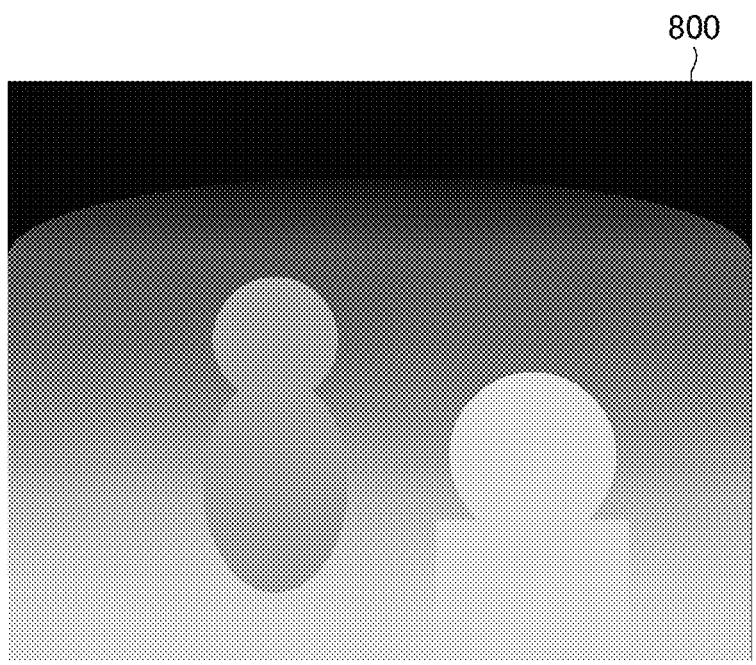
FIG. 8 is a diagram exemplifying a defocus map according to the first example.

FIG. 8 is a diagram illustrating a defocus map for an image for display. The defocus map 800 is generated by the distance information generation unit 300 under control of the system control unit 101 in S402 of FIG. 6. As the defocus map 800, an example in which defocus amounts normalized with the depth of focus are converted into gray scale values to be visualized is shown. A pixel representing a shorter distance to the subject (subject distance) from the camera 100 has a value close to white (a high pixel value), and a pixel representing a longer distance to the subject has a value close to black (a low pixel value). Areas on which focus is put (focused area) are represented in gray scale of continuous values so that 15% thereof is displayed in gray. For example, the focused figure subject 501 is displayed with 15% gray. The figure subject 502 in a pin state in the rear side is displayed with 35% gray. In addition, in the defocus map 800, the area corresponding to the horizon 503 is deformed due to the influence of distortion aberration caused by the optical system 104. Further, a size of a fine block at the time of calculation of a defocus amount is set to 10×10 pixels, and a size of the defocus map 800 is set to 600×400 pixels.

FIGS. 9A and 9B are schematic diagrams illustrating an image for display and a defocus map after distortion/blur correction. The distortion/blur correction unit 301 performs distortion aberration correction and electronic image blur correction (which will be referred to simply as image blur correction below) under control of the system control unit 101 in S403 of FIG. 6. FIG. 9A illustrates an image for display 900 after correction, and FIG. 9B illustrates a defocus map 901 after correction. It can be seen that deformation caused by distortion aberration has been corrected. Because edges in an image for display in peaking display of the related art are extracted and displayed with a highlight, distortion aberration correction and image blur correction may be performed only on an image for display. However, in a case where a defocus map is superimposed on an image for display and displayed (display of a map-superimposed image), distortion aberration correction and image blur correction need to be performed on the defocus map based on correction processing performed on the image for display. The reason for this is to curb a positional shift between the defocus map and the image for display. By superimposing the defocus map with corrected positional shift on the image for display and displaying the image, the distance information can be superimposed on a correction area while eliminating unnatural appearances.

It is better to employ different pixel interpolation operation methods to perform distortion aberration correction and image blur correction for the image for display and the defocus map. Specifically, in a case where an image for display is corrected, an interpolation method in which weighted synthesis (weighted addition) is performed with reference to values of surrounding pixels, like bilinear interpolation in which a pixel of interest and its four surrounding pixels are referred to, and the like, is selected. The reason for this is that, if pixel values are processed to be smoothly changed in processing of creating an image to be viewed by a user, the user feels that the image quality is good.

On the other hand, in a case where an image is generated by interpolating pixel values of a defocus map, there is a problem with bilinear interpolation in a so-called perspective competing area in which a pixel with a long subject distance is present around a pixel with a short subject distance. In a case where a pixel value indicating an intermediate distance (e.g., a pixel value indicating being in focus) occurs, there is a possibility that wrong distance information is displayed. Thus, a nearest neighbor interpolation method is selected as an interpolation operation method for the defocus map that is an image with values to be evaluated.

In the present example, distortion aberration correction and image blur correction are performed on the defocus map. For example, it is assumed that distortion aberration correction and image blur correction are performed on the A and B images referred to in S402 of FIG. 6. In this case, if a blur component is included particularly in a roll direction, the direction of parallax is changed to the pupil division direction (the horizontal direction in the present example) due to the image blur correction. For this reason, there is a possibility that the calculation result of the above formula (1) for calculating the correlation amount will deviate depending on the presence or absence of correction. Particularly, if the subject image has diagonal lines, the effect will be large, and thus there is a possibility of accuracy of the calculated defocus map deteriorating. In addition, in order to reduce the calculation load, eliminating the correction processing can be selected if the amounts of distortion aberration correction and image blur correction of a captured image are smaller than a predetermined amount (threshold).

The resizing unit 302 performs resizing so that the resolution of the defocus map that has been corrected in S403 has the same resolution as that of the displayed image under control of the system control unit 101 in S404 of FIG. 6. In the present example, a size of the defocus map is 600×400 pixels, and a size of the displayed image is 6000×4000 pixels. Thus, enlargement processing is performed on the defocus map so that it is enlarged 10 times in the horizontal direction and the vertical direction. At this time, the nearest neighbor interpolation method is selected for a pixel interpolation operation method in the enlargement processing as in S403.

With respect to processing order of the distortion aberration correction, the image blur correction, and the resizing, the resizing of S404 of FIG. 6 is performed later than the distortion aberration correction and the image blur correction of S403. Different from the displayed image for viewing, the resolution of the defocus map can be lowered using a setting of fine blocks. If the resolution is lowered, the operation load and operation scale imposed on the distortion aberration correction and the image blur correction can be reduced.

Next, color information conversion processing performed by the color information conversion processing unit 303 under control of the system control unit 101 in S405 of FIG. 6 will be described. In processing of converting a defocus amount into color information, a grayscale value representing a defocus amount is converted into a color value (chrominance signal UV) in lookup table conversion or the like. In terms of color value, for example, conversion into a color such as a color contour, which is from blue, light blue, green, yellow to red, is performed in ascending order of grayscale values. The color scheme of the color contour can be selected and set according to the preference and visibility of a user. The color contour can be selected from blue, light blue, green, yellow to red, for example, in descending order of gray scale values. That is, in the present example, the type of style of the color conversion with respect to the distance information distribution can be changed or adjusted. By expressing a distance information distribution using colors as above, subtle differences in blur that are difficult to identify on a relatively small-sized monitor, such as the liquid crystal monitor of the camera 100, are visually identified with ease. Thus, user convenience to adjust a depth or a focus position can be improved.

In addition, in a conversion from a grayscale value indicating a defocus amount into color information, the focus area indicated with 15% gray in FIG. 9B may be converted to have one color, for example, green. In peaking display of the related art, an image for display has a high dependence on edge strength, and there is a possibility of peaking display reacting to an intensified edge portion such as the boundary of a building even in a defocus area. On the contrary, in the present example, the dependence on edge strength can be reduced by using a defocus amount based on a parallax amount, and thus a user can more correctly recognize the focus. Furthermore, because the focus can be expressed with colors like the color contour described above, convenience in visibility of the user can be improved. A data conversion for determining the degree of focus by a color density (display density) in that case will be described with reference to FIGS. 10A and 10B.

Figure 10A:
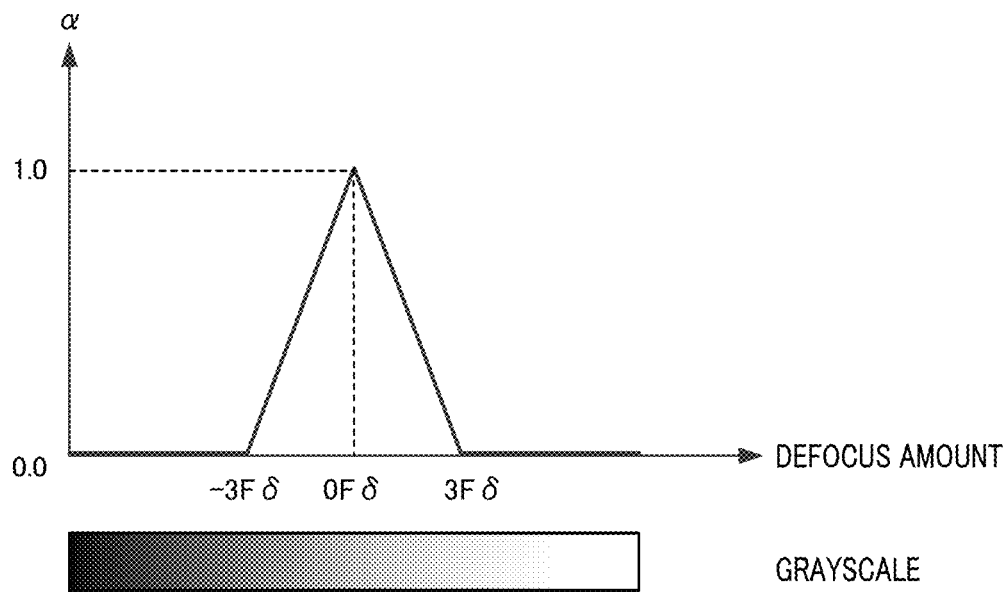
FIGS. 10A and 10B are illustrative diagrams for conversion of a defocus amount into a information according to the first example.
Figure 10B:
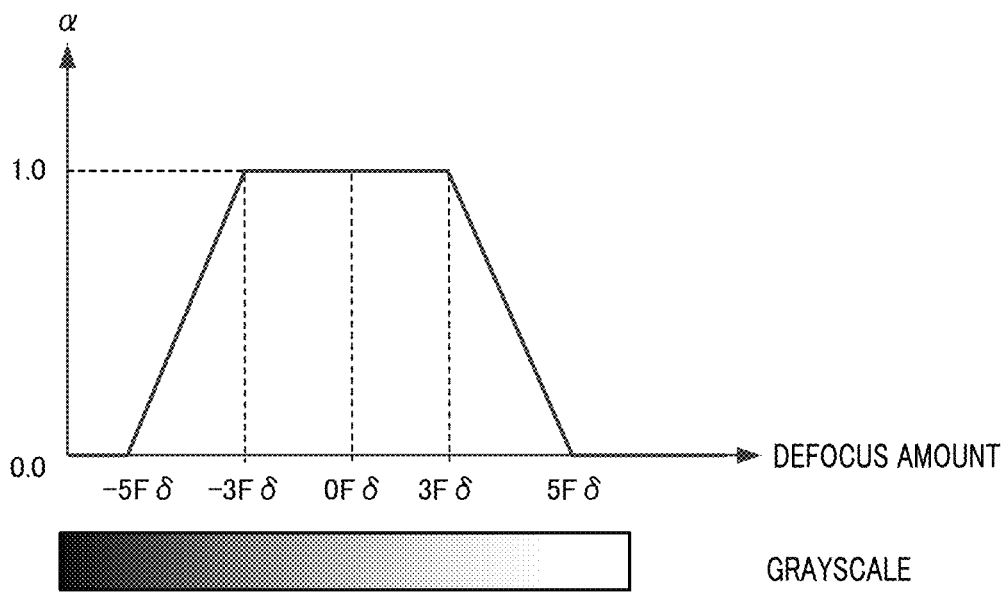

FIGS. 10A and 10B are diagrams for describing a conversion from a defocus amount to α information. The horizontal axis represents defocus amount, and the vertical axis represent α value. α information is information for determining a density on display, and it is assumed that coloring processing is performed such that color becomes stronger as an α value gets closer to 1.0. FIG. 10A illustrates an exemplary triangular graph, and FIG. 10B illustrates an exemplary trapezoidal graph.

In FIG. 10A, the α value is zero in the range in which the defocus amount is less than $-3$ F$\delta$, and the α value linearly increases as the defocus amount increases in the range in which the defocus amount is equal to or greater than $-3$ F$\delta$ and less than 0 F$\delta$. The α value corresponding to the defocus amount (0 F$\delta$) indicated with 15% gray is 1.0. The α value linearly decreases as the defocus amount increases in the range in which the defocus amount is greater than 0 F$\delta$ and less than 3 F$\delta$. The α value is zero in the range in which the defocus amount is equal to or greater than 3 F$\delta$.

In FIG. 10B, the α value is zero in the range in which the defocus amount is less than $-5$ F$\delta$, and the α value linearly increases as the defocus amount increases in the range in which the defocus amount is equal to or greater than $-5$ F$\delta$ and less than $-3$ F$\delta$. The α value is 1.0 in the range in which the defocus amount is equal to or greater than $-3$ F$\delta$ and smaller than or equal to 3 F$\delta$. The α value linearly decreases as the defocus amount increases in the range in which the defocus amount is greater than 3 F$\delta$ and less than 5 F$\delta$. The α value is zero in the range in which the defocus amount is equal to or greater than 5 F$\delta$.

The range of the defocus amount for strong coloring as described above can be adjusted by a user to a desired range. The user can set the range to an arbitrary range by widening or narrowing the focus range (the width of the upper side portion of the trapezoid in FIG. 10B) according to the purpose, and the convenience can be improved. Further, whether to set a display form to the color contour or one-color display can be designated in advance by the user through a setting operation for the camera 100.

The superimposition processing unit 304 superimposes the color information converted from the defocus amount in S405 on the correction-processed image for display to be transparent under control of the system control unit 101 in S406 of FIG. 6. Specifically, in a case that the display form is the color contour, processing of substituting the chrominance signal UV of the image for display with a chrominance signal UV of the color contour is performed. In this case, a conversion may be performed in advance so that the range of the luminance signal Y becomes smaller to prevent the hue after superimposition from changing significantly depending on the value of the luminance signal Y in the image for display. Specifically, the conversion is performed so that the range of the value becomes 20 to 235 on the assumption that the range of the original luminance signal Y is 8 bits from 0 to 255.

Figure 11:
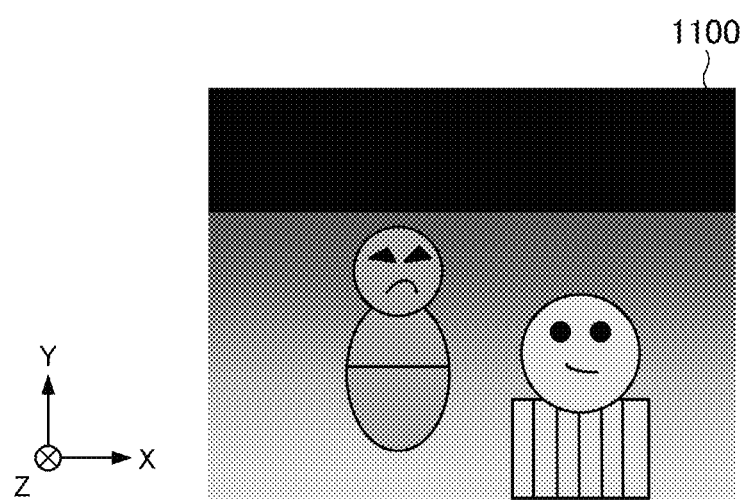
FIG. 11 is an illustrative diagram of an image display example according to the first embodiment.

FIG. 11 is a schematic diagram illustrating a map-superimposed image 1100 obtained by superimposing the defocus map of FIG. 9B on the image for display of FIG. 9A. Although the image is displayed in gray in FIG. 11 for convenience, it is displayed in color on an actual screen. Further, in a case that the display form is one color display, weighted addition is performed between the image for display and a YUV signal value of one color based on the α value in S405 of FIG. 6. Because a user can visually recognize the image for display on which the information of the defocus map has been transparently superimposed, he can easily grasp the correspondence relationship between depth and focus information. Thus, the user can adjust the depth and the focus state on the photographed scene while checking them.

In addition, edges of the image for display may be extracted and combined with color conversion information. Because edges of the image for display with color removed are used in this configuration, there are advantages that color information converted from the defocus amount is not mixed with color of the image for display and the information of the defocus map can be easily viewed.

Although the example in which a defocus amount is converted into color information to increase user's visibility has been introduced in the present example, a defocus amount in a grayscale state may be displayed to reduce a processing load. Also in this case, a difference in fine blur can be more easily identified on the liquid crystal monitor of the camera 100. User's convenience to adjust a depth or a focus position can be improved.

The system control unit 101 performs control such that the display unit 109 displays the image for display with the defocus map generated by the image processing unit 107 transparently superimposed thereon in S407 of FIG. 6. The user can recognize the map-superimposed image displayed on the screen of the display unit 109. The depth and the focus state can be grasped with good visibility using distance information superimposed with a reduced positional shift while resolving unnatural appearances by correcting distortion aberration and the like. For example, in S408 of FIG. 6, the user makes an operation to change the aperture value of the optical system 104 to the smaller aperture side while viewing the displayed image on the display unit 109 so that the desired figure subject 502 (FIG. 7) is within the depth. The system control unit 101 drives the aperture of the optical system 104 according to the operation instruction from the user.

In S409 of FIG. 6, the system control unit 101 checks whether the user has given a photographing instruction via the operation input unit 110. If a photographing instruction has been given, the processing proceeds to S410. The depth becomes greater when the aperture value is changed to the smaller aperture side in S408, and then the figure subject 502 (FIG. 7) in the focus state is also within the depth. An image with changed color display indicating an area on which focus is (focused area) is displayed. The user can adjust the aperture value while viewing the displayed map-superimposed image as described above. The user ascertains that his desired color is superimposed on the image of the figure subject 502, that is, the figure subject 502 is within the depth, and gives a photographing instruction to the camera 100.

In S410 of FIG. 6, the system control unit 101 performs control of a photographing operation according to the photographing instruction from the user via the operation input unit 110 and records captured image data on the recording medium 108. As described above, the user can determine optimum setting conditions for photographing while checking depth. Noise deterioration due to an increase in ISO sensitivity caused by setting to an excessively small aperture side and occurrence of subject blur caused by an increased exposure time can be curbed.

According to the present example, by presenting a map-superimposed image in which distance information with a corrected positional shift is superimposed on an image for display to a user, convenience in adjustment of a focus position and depth can be further improved.

Modified Example of First Example

Although the aspect in which a defocus map is superimposed on an image for display and displayed at all times has been described in the first example, the present invention is not limited thereto. In a modified example, an operation device such as a push button is provided on the operation input unit 110. Processing of superimposing a defocus map on an image for display and displaying the image is performed only while a user is operating the operation device. That is, display processing of a map-superimposed image may be performed only in a display period. By configuring as described above, a map-superimposed image can be adaptively displayed only when a user wants to check the depth and focus while reducing change in the display form during photographing, and thus user convenience can be improved. In addition, in the modified example, processing of limiting an area superimposed in the image for display only within the AF frame area, for example, is performed. Thus, the user can check the focus state of the area of interest while reducing the change in the display form that occurs in the related art in which no map is superimposed.

In addition, the image processing unit 107 of the modified example performs loop processing in which maps calculated in the past are added to the defocus map to get the average for the purpose of reducing fluctuation (variation) of the defocus map in the time axis direction. With this configuration, fluctuation in display of a map-superimposed image displayed on the display unit 109 can be reduced. User's visibility when adjusting the depth and focus position can be improved. In addition, it is possible to prevent abrupt color switching from occurring when the user performs an operation to change an aperture value and to display preferable appearance. In this case, processing of storing image data in a dedicated RAM in the loop processing is performed to be in processing order before the distortion aberration correction and image blur correction of S403 of FIG. 6. The loop processing can be performed at the timing at which data is read from the RAM 103 to the dedicated RAM. Because the number of access operations with respect to the RAM 103 can be reduced, the system load imposed on the entire camera 100 can be reduced. In this case, multiple distortion/blur correction unit 301 may be provided for different applications. The different applications may be, for example, applications to display of an image with a high resolution and to a defocus map with a low resolution. The processing loads and costs can be balanced by providing the dedicated RAM for defocus maps with a low resolution.

Furthermore, there is a configuration in which an optical flow obtained by making a distribution of motion vector information into a map is superimposed on an image for display and the image is displayed, for example, as a method that does not depend on subject distance as a modified example. The motion vector information is information of the movement direction and movement amount of a subject, and a movement (motion) of a subject includes a movement in an arbitrary direction and a movement in a depth direction within a two-dimensional plane. In addition, the configuration to photographing a still image has been described in the first example. The present invention is not limited thereto, and can also be applied to a configuration to photographing a moving image. Configurations thereof are similar in the examples to be described below.

Second Example

A second example of the present invention will be described with reference to FIGS. 12 to 15. Further, similar constituent elements of the present example to those of the first example will not be described in detail and differences thereof will be mainly described using the used reference numerals.

The distance information generation unit 300 of the present example calculates a defocus map by using a parallax image of which the resolution has been compressed in the parallax direction in order to improve the operation speed when defocus distribution information is generated. Furthermore, in this case, filtering is performed such that a defocus amount for major subjects remains while the occurrence of unnatural artifacts on a defocus map is prevented. A presentation interval of map-superimposed images can be shortened to check the depth at a higher speed, and user convenience at the time of adjustment of the depth can be improved.

Figure 12:
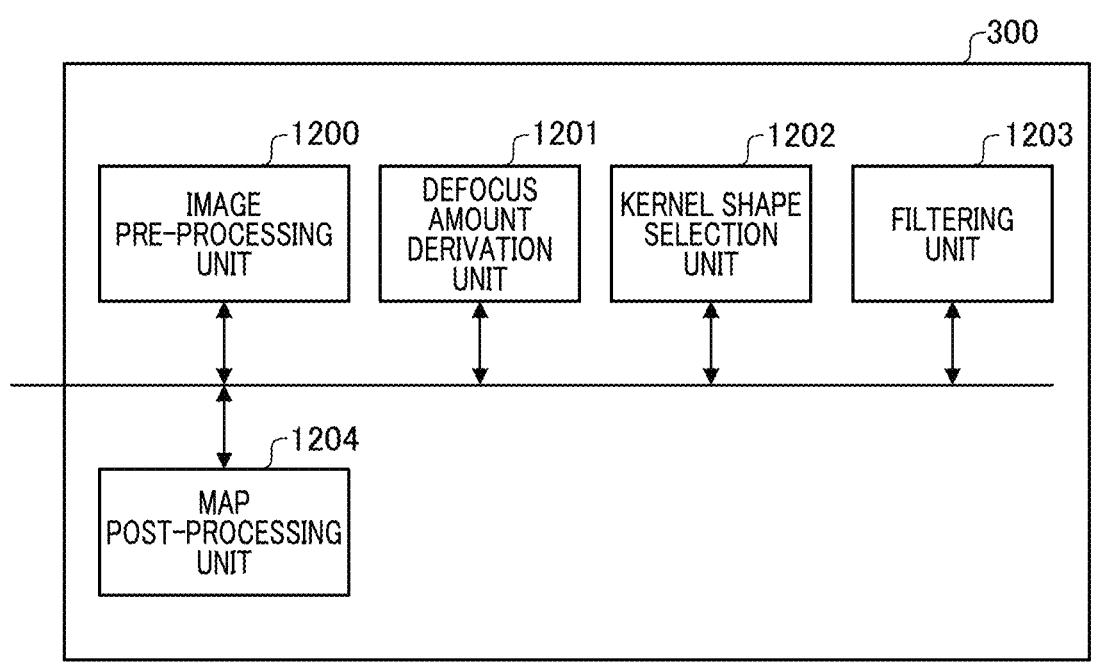
FIG. 12 is a block diagram illustrating a configuration of a distance information generation unit according to a second example.

A detailed configuration of the distance information generation unit 300 will be described with reference to FIG. 12. FIG. 12 is a functional block diagram of the distance information generation unit 300 that includes an image pre-processing unit 1200, a defocus amount derivation unit 1201, a kernel shape selection unit 1202, a filtering unit 1203, and a map post-processing unit 1204.

The image pre-processing unit 1200 performs pre-processing on acquired parallax information (a group of images having parallax). The pre-processing is processing performed before a derivation operation of a defocus amount. The defocus amount derivation unit 1201 derives a defocus amount to generate a defocus map.

The kernel shape selection unit 1202 selects a shape of a filter kernel to be used by the filtering unit 1203. The filtering unit 1203 performs filtering on the defocus map generated by the defocus amount derivation unit 1201. The filtering unit 1203 has the effect of biasing the filter effect in a specific direction as will be described below. The map post-processing unit 1204 performs post-processing on the defocus map according to the processing details of the image pre-processing unit 1200.

Figure 13:
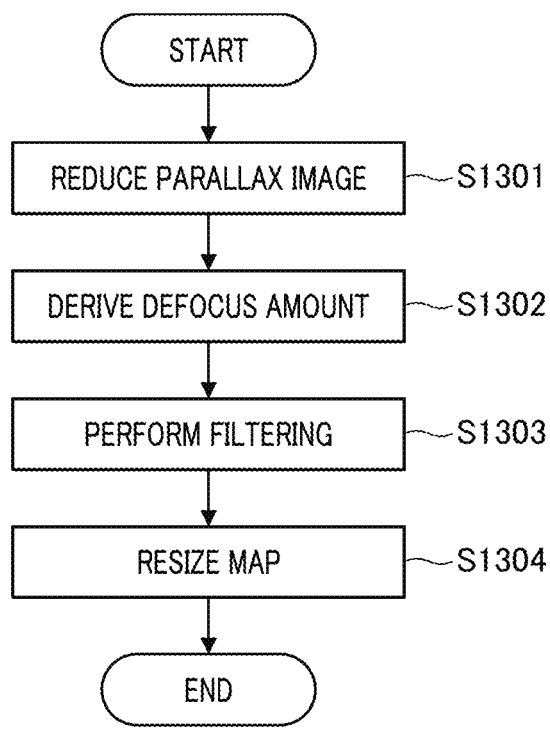
FIG. 13 is a flowchart for explaining processing according to the second example.
Figure 14:
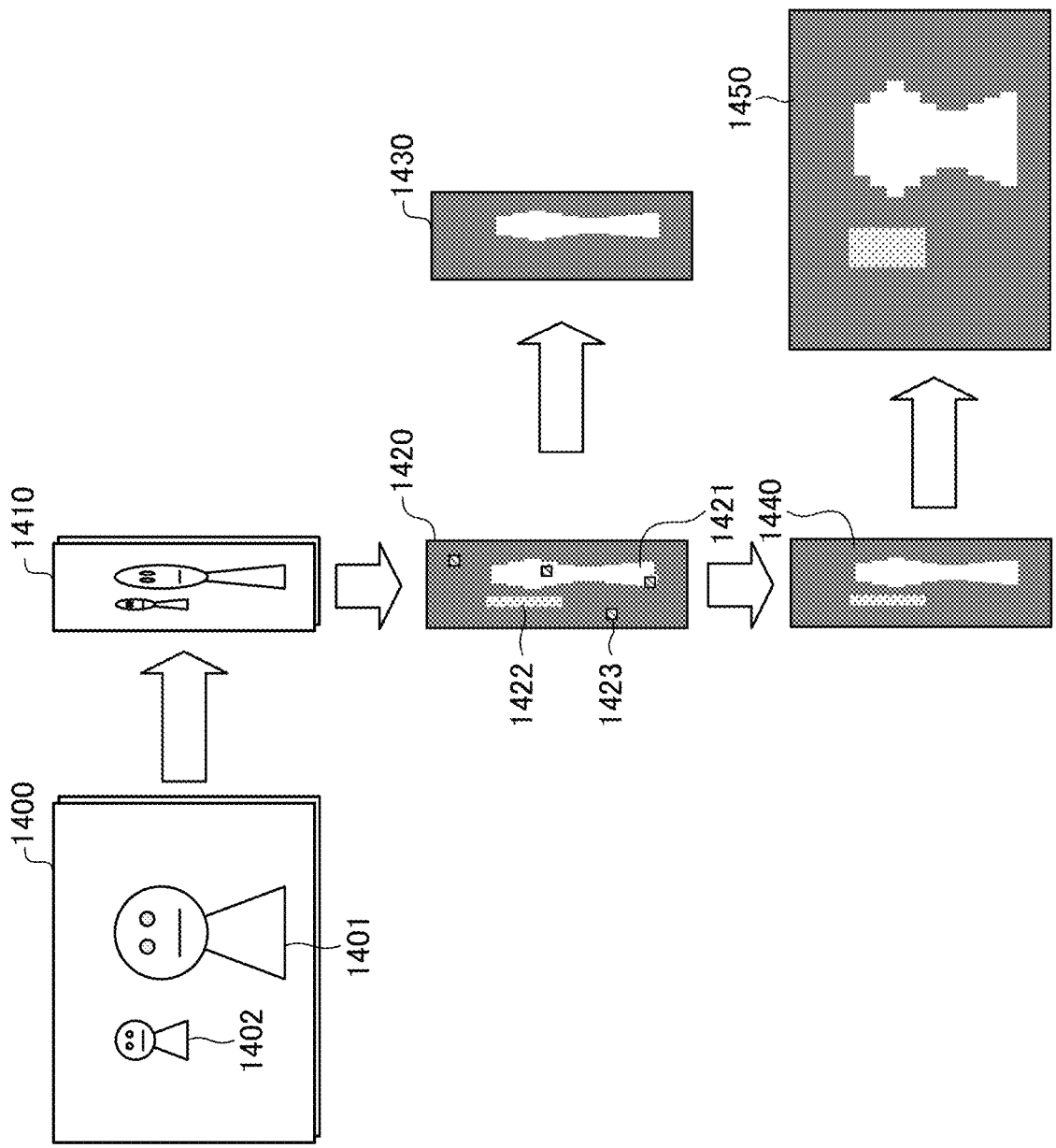
FIG. 14 is a schematic diagram for explaining the processing according to the second example.

A flow of processing in the present example will be described with reference to FIGS. 13 and 14. FIG. 13 is a flowchart describing exemplary processing. FIG. 14 is a schematic diagram illustrating specific exemplary processing. The following processing is implemented by the CPU of the system control unit 101, for example, reading a program stored in the ROM 102 and loading the program in the RAM 103 for execution.

In S1301, the image pre-processing unit 1200 performs pre-processing of a derivation operation on a defocus amount for an image 1400 (FIG. 14) having acquired parallax. Although there are viewpoint images corresponding to the number of parallax in actual processing, only one image is shown in FIG. 14 in order to simplify description. An image of a subject 1401 in focus and an image of a subject 1402 projected in a small size out of focus are present in the image 1400. In the present example, resolution reduction processing is performed in the parallax direction to improve an operation speed. In a case that a size of an acquired image is 6000×4000 pixels, for example, reduction processing is performed on the image to reduce the size of the image to one third, which is 2000×4000 pixels. As a result, a reduced image 1410 is generated. In the present example, the one-third reduction processing is performed by calculating the average value of adjacent three pixels. The example is not limited thereto, and the one-third reduction processing may be performed by thinning out two pixels out of adjacent three pixels.

In S1302, the defocus amount derivation unit 1201 derives a defocus amount using the reduced image 1410 acquired in S1301 and generates a defocus map 1420. The details of the operation are as described in the first example. A distribution of the defocus map 1420 includes a defocus amount 1421 for the subject 1401 and a defocus amount 1422 for the subject 1402. In addition, noise 1423 schematically indicates noise generated at the time of the derivation operation of the defocus amounts. A size of a fine block at the time of the calculation of the defocus amounts is 10×10 pixels as in the first example. A size of the defocus map is 200×400 pixels corresponding to the image reduction, unlike in the first example.

In S1303, the kernel shape selection unit 1202 selects a shape of a filter kernel to be used by the filtering unit 1203 according to the processing details performed by the image pre-processing unit 1200. The filtering unit 1203 performs filtering on the defocus map derived by the defocus amount derivation unit 1201. In the present example, median filtering is performed to remove noise. Kernel shapes will be described using FIG. 15.

Figure 15:
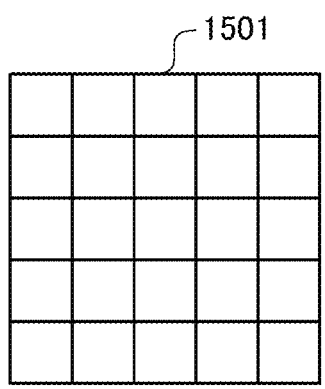
FIG. 15 is a schematic diagram exemplifying a filter kernel shape.
Figure 15:
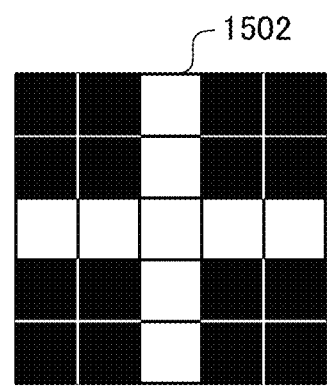

FIG. 15 is a schematic diagram exemplifying kernel shapes (square and cross). In median filtering of the related art, for example, a square median filter like a kernel 1501 is used. In a case that median filtering is performed on the defocus map 1420 using the kernel 1501, the noise 1423 can be removed using the median filtering, as illustrated in a defocus map 1430 (see FIG. 14). However, the defocus amount 1422 is calculated from data corresponding to an image obtained by reducing the subject 1402 projected in a small size in the image in the parallax direction. For this reason, there is concern that the defocus amount will be removed along the noise 1423 due to the median filtering. Thus, in the present example, the median filtering is performed using a cross kernel 1502. Thus, the noise removal effect can be exhibited without removing information of elongated areas (see the defocus amount 1422) in the defocus map 1440.

A shape of a filter kernel is not limited to the cross kernel 1502 illustrated in the present example. For example, an aspect ratio may be changed according to the degree of reduction. That is, filter characteristics are determined according to a direction or a reduction rate of image reduction processing. In a case that a parallax direction is not the horizontal direction, a kernel in a shape obtained by rotating a cross according to the parallax direction can be used. In addition, a shape of the filter kernel may not be selected for each frame. For example, in a case that a parameter of the processing performed in S1301 of FIG. 13 is constant, a fixed kernel shape can be used.

In S1304, the map post-processing unit 1204 performs post-processing on the filter-processed defocus map 1440. Enlargement processing is performed to undo the change of the aspect ratio caused by the reduction in the parallax direction performed in S1301. Specifically, enlargement processing to increase the size three times in the parallax direction (the horizontal direction in the present example), like the defocus map 1450 of FIG. 14, is performed. As a result, a size of the generated defocus map is 600×400 pixels as in the first example.

In the present example, an operation speed when the defocus map is generated from the acquired parallax information (the group of images having parallax) can be improved. Filtering can be performed such that the defocus amounts for major subjects remain while the occurrence of unnatural artifacts on the defocus map is prevented.

Modified Example of Second Example

Although the processing that the defocus map is generated only using the group of images reduced for the purpose of improving the operation speed has been introduced in the second example, the invention is not limited thereto. In a modified example, defocus maps corresponding to different pre-processing are derived and filtering with different characteristics is performed to improve reliability in maps. For example, defocus maps are derived from a first group of images of which size has been reduced and a second group of images of which size has not been reduced and then filtering is performed. Then, the two defocus maps are integrated (merge processing) and thereby a final defocus map is generated. In the filtering, median filtering with a cross kernel is performed on the defocus map derived from the first group of images. Meanwhile, median filtering with a square kernel as in the related art is performed on the defocus map derived from the second group of images.

For the merge processing in the modified example, the following method can be used. However, the defocus map derived from the second group of images of which size has not been reduced will be referred to as a "normal map," and the defocus map derived from the first group of images of which size has been reduced will be referred to as a "reduced map" below to simplify the notation.

Although a value of the normal map is basically used as a defocus map, a value of the reduced map is used depending on a predetermined condition (selection processing). The predetermined condition may be, for example, a condition that reliability of the normal map is less than a threshold. The reliability can be obtained from the variance value of fine blocks of an image used to derive a defocus amount. Alternatively, the reliability may be obtained from a deviation value of a defocus amount with respect to a surrounding area. Since the method for calculating reliability is known, detailed description thereof will be omitted. In an area in which reliability of the normal map is low, a value of the reduced map is used. Alternatively, in an area in which reliability of the normal map is low, only information of the defocus direction indicated by the value of the reduced map may be recorded.

In addition, for example, if there is a repeating pattern in an out-of-focus area on the normal map, there is a possibility of a defocus amount indicating wrong focus being derived. For this reason, processing of outputting a value of the reduced map is performed for an area in which a defocus amount indicating out-of-focus has been derived.

In addition, for example, because the group of images of which size has been reduced is used to generate the reduced map, there is a possibility of boundaries of an area being rough. Thus, in an area derived as a defocus area that is in focus in the reduced map and out of focus in the normal map, processing of outputting the value of the normal map is performed assuming that the reduced map is out of the way.

In the modified example, a parameter indicating a size of a processing block (fine block) used to calculate a defocus amount is set as a parameter for processing image division. Characteristics of the filtering are determined according to the size or aspect ratio of the processing block. For example, the kernel shape selection unit 1202 selects a kernel shape according to a value of the parameter set by the defocus amount derivation unit 1201.

Although the processing of deriving a defocus amount after a size of a group of images is reduced has been introduced in the second example, the invention is not limited thereto. In a modified example, processing of enlarging a size of a fine block (10×10 pixels) at the time of calculation of a defocus amount three times in the parallax direction is performed, and thus the size becomes 30×10 pixels. With this operation, even if the size of the group of images is not reduced, the size of the defocus map becomes 200×400 pixels, and processing similar to that of the second example can be performed.

According to the present embodiment, by superimposing an image corresponding to distance information with a corrected positional shift is superimposed on a captured image for display and presenting the resultant image to a user, convenience in adjustment of a focus position and depth can be further improved.

Although exemplary embodiments of the present invention have been described above, the present invention is not limited thereto, and can be variously modified and changed in the scope of the gist of the invention. Specifically, although a digital camera that is one of an application example of the image processing device has been described, it can be applied to a computer having the functions of the image processing unit 107 or the like. In addition, although it is assumed that a defocus map is generated based on a group of images having parallax in the above-described example, the invention is not limited to this method as long as a distance distribution of subjects in an imaging range corresponding to a captured image can be acquired. The defocus map generation method includes a DFD method in which a defocus amount is derived from a correlation of two images with different focuses and aperture values. DFD is an abbreviation for "Depth From Defocus." In addition, the distance distribution of subjects can be derived using information related to distance distribution obtained from a distance measurement sensor module of a TOF method, or the like. TOF is an abbreviation for "Time Of Flight" Alternatively, it is possible to acquire information related to a distance distribution using a contrast distance measurement method based on contrast information and evaluation values of a captured image. Regardless of information related to a distance distribution acquired using any method, it is possible to reduce a positional shift between the distance distribution and the captured image and realize more accurate display of a map-superimposed image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087848, filed May 25, 2021, which is hereby incorporated by reference herein in its entirety.

What is claimed is:

1. An image processing device that acquires an image and relevant information of a subject of the image, the image processing device comprising:
   at least one processor and/or circuit configured to function as a plurality of units comprising:
   (1) a deformation unit configured to perform deformation processing on the image and the relevant information; and
   (2) an output unit configured to output the deformation-processed image and the deformation-processed relevant information,
   wherein the deformation unit performs the deformation processing on the relevant information corresponding to the deformation processing performed on the image, and
   wherein the deformation unit performs (a) first deformation processing on the image having a first resolution and (b) second deformation processing on the relevant information having a second resolution that is lower than the first resolution.

2. The image processing device according to claim 1, wherein the deformation unit performs aberration correction, image blur correction, or resizing.

3. The image processing device according to claim 1, wherein the relevant information comprises a distribution of additional information related to the image, which is a distribution of distance information of the image or a distribution of motion vector information of the image.

4. The image processing device according to claim 3, wherein the distribution of the distance information is a distribution of parallax information acquired from a group of images with different parallax, a distribution of contrast information acquired from a group of images with different focuses, or a distance distribution acquired in a TOF method.

5. The image processing device according to claim 4, wherein the parallax information is two-dimensional information having the same pixel structure as the image and includes any of a defocus amount of a captured image, a relative image shift amount between different viewpoints, and distance information.

6. The image processing device according to claim 1, wherein the output unit performs resizing to the deformation-processed relevant information so that the resized deformation-processed relevant information has same resolution as that of the image.

7. The image processing device according to claim 1, wherein the output unit superimposes an image based on the relevant information on the image and outputs the superimposed image.

8. The image processing device according to claim 7, wherein the plurality of units further comprises:
    an acquisition unit configured to acquire a distribution of additional information related to the image as the relevant information; and
    a display unit configured to display the superimposed image output by the output unit.

9. The image processing device according to claim 8, wherein the deformation unit performs the deformation processing on the distribution of the additional information using a nearest neighbor interpolation method of calculating a new pixel value from a value of a pixel of interest and a value of surrounding pixels of the pixel of interest.

10. The image processing device according to claim 8, wherein the deformation unit performs the deformation processing on the image using an interpolation method of calculating a new pixel value by performing weighted synthesis on a value of a pixel of interest and a value of surrounding pixels of the pixel of interest.

11. The image processing device according to claim 8, wherein the output unit performs change of a type of style of a color conversion with respect to the distribution of the additional information or adjustment of a density of display.

12. The image processing device according to claim 8, wherein the plurality of units further comprises a loop processing unit configured to average the additional information calculated in the past and the acquired distribution of the additional information.

13. The image processing device according to claim 8, wherein the plurality of units further comprises:
    a derivation unit configured to derive the distribution of the additional information related to the image; and
    a filtering unit configured to perform filtering on the distribution of the additional information.

14. The image processing device according to claim 13, wherein the derivation unit calculates a distribution of the additional information using an image of which a resolution has been compressed in a parallax direction.

15. The image processing device according to claim 13, wherein the filtering unit has a median filter and biases a filtering effect in a specific direction by using a cross kernel.

16. The image processing device according to claim 13, wherein the plurality of units further comprises:
    a pre-processing unit configured to perform pre-processing on the image; and
    a selection unit configured to select a shape of a kernel used by the filtering unit according to details of processing performed by the pre-processing unit.

17. The image processing device according to claim 16, wherein the pre-processing unit performs reduction processing on the acquired image, and
    wherein characteristics of the filtering unit are determined according to a direction or a reduction rate of the reduction processing of the image.

18. The image processing device according to claim 17, wherein the plurality of units further comprises a post-processing unit configured to perform enlargement processing on an output of the filtering unit, and
    wherein the post-processing unit performs the enlargement processing after the deformation processing.

19. The image processing device according to claim 18, wherein the plurality of units further comprises a loop processing unit configured to average the acquired distribution of the additional information and the additional information calculated before the deformation processing or the enlargement processing.

20. The image processing device according to claim 16, wherein the distribution of the additional information is a distribution of parallax information acquired from a group of images having different viewpoints, and
    wherein characteristics of the filtering unit are determined according to a parallax direction.

21. The image processing device according to claim 16, wherein the derivation unit sets a parameter to be used in division processing of the image, and
    wherein characteristics of the filtering unit are determined according to the parameter.

22. The image processing device according to claim 21, wherein the parameter is a parameter indicating a size of a block to be used in calculation of the distribution of the additional information, and
    wherein characteristics of the filtering unit are determined according to the size or an aspect ratio of the block.

23. The image processing device according to claim 16, wherein the pre-processing unit performs first and second pre-processing on the image, and
    wherein the derivation unit (a) derives a distribution of first additional information from the image that has undergone the first pre-processing, (b) derives a distribution of second additional information from the image that has undergone the second pre-processing, and (c) integrates the distributions of the first and second additional information.

24. The image processing device according to claim 23, wherein pre-processing unit performs reduction processing on the image in the first pre-processing, and does not perform reduction processing on the image in the second pre-processing.

25. The image processing device according to claim 23, wherein the derivation unit integrates the distribution of the additional information by selecting the first or second additional information based on a predetermined condition.

26. An imaging device comprising:
    an image sensor; and at least one processor and/or circuit configured to function as a plurality of units comprising:
(1) a deformation unit configured to perform deformation processing on an image and relevant information; and
(2) an output unit configured to output the deformation-processed image and the deformation-processed relevant information,
wherein the deformation unit performs deformation processing on the relevant information corresponding to the deformation processing performed on the image, and
wherein the deformation unit performs (a) first deformation processing on the image having a first resolution and (b) second deformation processing on the relevant information having a second resolution that is lower than the first resolution.

27. The imaging device according to claim 26, wherein the image sensor includes a plurality of microlenses and a plurality of photoelectric conversion units corresponding to the microlenses, respectively, and outputs a plurality of image signals having different viewpoints.

28. An image processing method performed by an image processing device that acquires an image and relevant information of a subject of the image, the method comprising:
performing deformation processing on the image and the relevant information; and
outputting the deformation-processed image the deformation-processed relevant information,
wherein the performing performs the deformation processing on the relevant information corresponding to the deformation processing performed on the image, and
wherein the performing performs (a) first deformation processing on the image having a first resolution and (b) second deformation processing on the relevant information having a second resolution that is lower than the first resolution.

29. A non-transitory storage medium on which is stored a computer program for causing a computer of an image processing device that acquires an image and relevant information of a subject of the image to execute an image processing method, the method comprising:
performing deformation processing on the image and the relevant information; and
outputting the deformation-processed image and the deformation-processed relevant information,
wherein the performing performs the deformation processing on the relevant information corresponding to the deformation processing performed on the image, and
wherein the performing performs (a) first deformation processing on the image having a first resolution and (b) second deformation processing on the relevant information having a second resolution that is lower than the first resolution.

30. An image processing device that acquires an image and relevant information of a subject of the image, the image processing device comprising:
at least one processor and/or circuit configured to function as a plurality of units comprising:
(1) a deformation unit configured to perform deformation processing on the image and the relevant information; and
(2) an output unit configured to output the deformation-processed image and the deformation-processed relevant information,
wherein the deformation unit performs the deformation processing on the relevant information corresponding to the deformation processing performed on the image, and
wherein the deformation unit performs aberration correction, image blur correction, or resizing.

31. The image processing device according to claim 30, wherein the output unit performs resizing to the deformation-processed relevant information so that the resized deformation-processed relevant information has same resolution as that of the image.

32. The image processing device according to claim 30, wherein the output unit superimposes an image based on the relevant information on the image and outputs the superimposed image.

33. An image processing method performed by an image processing device that acquires an image and relevant information of a subject of the image, the method comprising:
performing deformation processing on the image and the relevant information; and
outputting the deformation-processed image and the deformation-processed relevant information,
wherein the performing performs the deformation processing on the relevant information corresponding to the deformation processing performed on the image, and
wherein the performing performs aberration correction, image blur correction, or resizing.

34. A non-transitory storage medium on which is stored a computer program for causing a computer of an image processing device that acquires an image and relevant information of a subject of the image to execute an image processing method, the method comprising:
performing deformation processing on the image and the relevant information; and
outputting the deformation-processed image and the deformation-processed relevant information,
wherein the performing performs the deformation processing on the relevant information corresponding to the deformation processing performed on the image, and
wherein the performing performs aberration correction, image blur correction, or resizing.

* * * * *